(12) United States Patent
Pyo (10) Patent No.: US 6,636,836 B1
(45) Date of Patent: Oct. 21, 2003

(54) COMPUTER READABLE MEDIUM FOR RECOMMENDING ITEMS WITH MULTIPLE ANALYZING COMPONENTS

(75) Inventor: Soon-kyu Pyo, Kyungki-do (KR)

(73) Assignee: Iwingz Co., Ltd., Seoul (KR)

( * ) Notice: Subject to any disclaimer, the term of this patent is extended or adjusted under 35 U.S.C. 154(b) by 0 days.

(21) Appl. No.: 09/390,500

(22) Filed: Sep. 3, 1999

(30) Foreign Application Priority Data

Jul. 21, 1999 (KR) ........................................ 1999-29483

(51) Int. Cl.⁷ .............................................. G06F 17/60
(52) U.S. Cl. .............................. 705/26; 706/12; 706/14; 707/10; 707/100
(58) Field of Search .............................. 705/26; 707/10, 707/100; 706/12, 14

(56) References Cited

U.S. PATENT DOCUMENTS

| | | | | |
|---|---|---|---|---|
| 4,870,579 A | * | 9/1989 | Hey | 364/419 |
| 4,996,642 A | * | 2/1991 | Hey | 705/27 |
| 5,634,051 A | * | 5/1997 | Thomson | 395/605 |
| 5,659,732 A | * | 8/1997 | Kirsch | 395/605 |
| 5,864,845 A | * | 1/1999 | Vorhees et al. | 707/5 |
| 5,873,080 A | * | 2/1999 | Coden et al. | 707/3 |
| 5,905,862 A | * | 5/1999 | Hoekstra | 395/200.32 |
| 5,987,446 A | * | 11/1999 | Corey et al. | 707/3 |
| 6,006,218 A | * | 12/1999 | Breese et al. | 707/3 |
| 6,041,311 A | * | 3/2000 | Chislenko et al. | 705/27 |
| 6,064,980 A | * | 5/2000 | Jacobi et al. | 705/26 |
| 6,078,914 A | * | 6/2000 | Redfern | 707/3 |
| 6,192,354 B1 | * | 2/2001 | Bigus et al. | 706/46 |
| 6,266,649 B1 | * | 7/2001 | Linden et al. | 705/26 |
| 6,266,668 B1 | * | 7/2001 | Vanderveldt et al. | 707/10 |
| 6,397,212 B1 | * | 5/2002 | Biffar | 707/5 |

FOREIGN PATENT DOCUMENTS

EP 822502 * 4/1998 ........... G06F/17/30

OTHER PUBLICATIONS

Rudich, J. Shopbots. (intelligent robotic agents), Link–Up vol. 16, No. 4 (Jul.–Aug. 1999) p. 26.*
Torode, C. Intelligent agents' for real?, Computer Reseller News, No. 706 (Oct. 21, 1996) p. 63.*
Wisewire to Present at Internet Showcase: Launches Personalized Internet Information Service Based on Machine Learning, PR Newswire (Apr. 29, 1997).*
Higgins, K. J. Intelligent Agents: Your Agent is Calling, Communications Week vol. 622 (Aug. 5, 1996) p. 45.*
Wexler, J. Smart agents will cooperate across networks, Network World vol. 13, No. 28 (Jul. 8, 1996) p. 1.*

* cited by examiner

*Primary Examiner*—Wynn W. Coggins
*Assistant Examiner*—Tim Brown
(74) *Attorney, Agent, or Firm*—Perman & Green, LLP (57) ABSTRACT

A system of software components is constructed which includes multiple recommendation agents, each having: a list of recommended items for each user; a numerical predicted rating representing the predicted extent of each user's preference for the item recommended and numerical value information representing confidence; and a user profile for holding basic information on each user and influential power information of each recommendation agent with respect to each user. A recommendation manager is constructed to: select one or more recommendation agents using the basic user information and the influential power information; generate a final list of recommended items; and adjust the influential power of each recommendation agent stored in said user agent according to the predicted score and the belief provided by each recommendation agent, and the extent of a user's actual preference for the recommendation.

1 Claim, 6 Drawing Sheets

COMPUTER READABLE MEDIUM FOR RECOMMENDING ITEMS WITH MULTIPLE ANALYZING COMPONENTS

BACKGROUND OF THE INVENTION

1. Field of the Invention

The present invention relates to a recommendation system as one of information filtering methods and more particularly to a system for recommending items with multiple analyzing components, for allowing a combination of various recommendation methods to be used by employing multiple recommendation agents and adjusting a value of influential power of each recommendation agent on a user to reflect the adjusted value on a subsequent recommendation.

2. Description of Related Art

"Information overload" is not a new story for the moderns any more and the amount of information is rapidly increasing. Automatic "information filtering" is one of the efforts to obtain appropriate information from the excessive information.

In a wide meaning, the information filtering denotes every action for sorting out only necessary information for a user from overflowing information. Information filtering techniques are widely adopted into range from electronic mail or news at an early stage to web files and articles on electronic commerce these days, reflecting current information resources and aspects of information consumption. In particular, as the electronic commerce and internet acceleratedly grow up lately, the information filtering techniques are more acutely required than has ever been.

There are a content-based filtering method and a collaborative filtering method in conventional information filtering methods.

The content-based filtering method has been most widely used since it made its first appearance. Briefly describing the content-based filtering method, characteristics of contents of items to be estimated are programmed and discerned and a value of each item is determined based upon characteristics favored by a user. This method has obtained great results in searching files on the web or filtering e-mail.

However, this content-based filtering method can be applied only to a case when contents are recognizable through a computer, e.g., texts. There is a trouble in applying the content-based filtering method to items whose contents are difficult to analyze, such as movies, music and food. Moreover, this method recommends only items that a user has already used or that are similar to those used by the user. Accordingly, novel or accidental discovery is difficult to occur, and user feedback for constituting and developing the user's profile should be obtained.

The collaborative filtering is provided to supplement disadvantages of the content-based filtering. The collaborative filtering method is based upon an idea that a person can make the better decision than the computer although it is substantially slow. In the collaborative filtering method, decision of values (estimation) of items to be filtered is not assigned to a program but to the person and the result of the estimation is used in the program. In other words, the person estimates items independently and the computer automatically collects the estimations and finds persons who have similar tastes. The result of the operations by the computer is used for making a decision related to a particular person or judging a value of an item. The collaborative filtering method may be applied to filter usual texts as well as fields in which the content-based filtering is weak, such as music, movies, restaurants and places recommendable for travel. The collaborative filtering method is disclosed in U.S. Pat. Nos. 4,870,579 and 4,996,642.

However, the collaborative filtering method also needs to obtain user feedback for constituting and developing user profiles. Furthermore, if a new user or item appears, recommendation or estimation becomes difficult. This makes it difficult to appropriately recommend items to a user having a peculiar taste. Because information on characteristics of items is not considered, the probability of giving a better recommendation is abandoned.

Recently, there have been attempts to combine both the two methods. However, most of attempts just partially use one technique based upon the other technique or are restricted a lot in applied fields. Such study is just for improving application techniques themselves but is lack in considering users who consume recommendations. As a result, the recent study is not enough to overcome a structural limit that a particular application has.

SUMMARY OF THE INVENTION

Accordingly, the present invention is directed to a system for recommending items with multiple analyzing components, which substantially obviates one or more of the limitations and disadvantages of the related art.

An objective of the present invention is to provide a system for individually serving users with electronic contents including electronic commerce and internet services using an automatic filtering technique and for recommending interesting items to each user, such as goods and service contents in an intellectual manner.

Another objective of the present invention is to provide a recommendation system for integrally applying a variety of analyzing methods to items and for allowing each analyzing method to be personalized for a particular user and to be discriminately applied to each user.

Additional features and advantages of the invention will be set forth in the following description, and in part will be apparent from the description, or may be learned by practice of the invention. The objectives and other advantages of the invention will be realized and attained by the structure as illustrated in the written description and claims hereof, as well as the appended drawings.

To achieve these and other advantages, and in accordance with the purpose of the present invention as embodied and broadly described, a system for recommending items with multiple recommendation agents comprises: the multiple recommendation agents each for providing a list of recommended items for each user and auxiliary information of the recommended items in its independent manner; a user agent for holding basic information on each user and influential power information of each recommendation agent with respect to each user; and a recommendation manager for selecting one or more recommendation agents from the plurality of recommendation agents using the basic user information and the influential power information of each recommendation agent with respect to each user received from the user agent, generates a final list of recommended items from the list or lists of recommended items suggested by the selected recommendation agent or agents using the basic user information and the influential power of each recommendation agent received from the user agent and the auxiliary information received from the selected recommendation agent or agents, and adjusting the influential power of each recommendation agent stored in the user agent according to a result of the recommendation.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF PREFERRED EMBODIMENT

Reference will now be made in detail to the preferred embodiments of the present invention, examples of which are illustrated in the accompanying drawings.

Before undertaking the detailed description, it may be advantageous to set forth definition of certain words and phrases used hereinafter in this specification.

The term "item" means a content provided to users through internet services or goods provided in internet shopping malls.

The term "recommendation" means a process of voluntarily suggesting items predicted that users would be interested in to users, namely, a mapping process between the items and the users.

The term "filtering" means a process of deriving a subset from a set of items by performing a particular operation with respect to the set of items.

The term "agent" denotes a software component for holding information related to tastes in items with respect to a particular user or a set of users logically grouped and for filtering items introduced from the outside based upon the above information. The term "agent" used throughout this specification is defined based upon its similarity in use in an actual life. The agent does not have all the characteristics of a usual "software agent" defined in the field of artificial intelligence.

The phrase "base information for recommendation" denotes information that the agent can use during the filtering and includes not only primary information, such as characteristics of users, characteristics of items, users' reactions and etc., but also various kinds of processed information derived from the primary information.

With reference to the accompanying drawings, the recommendation system according to the present invention will now be described in detail.

Figure 1:
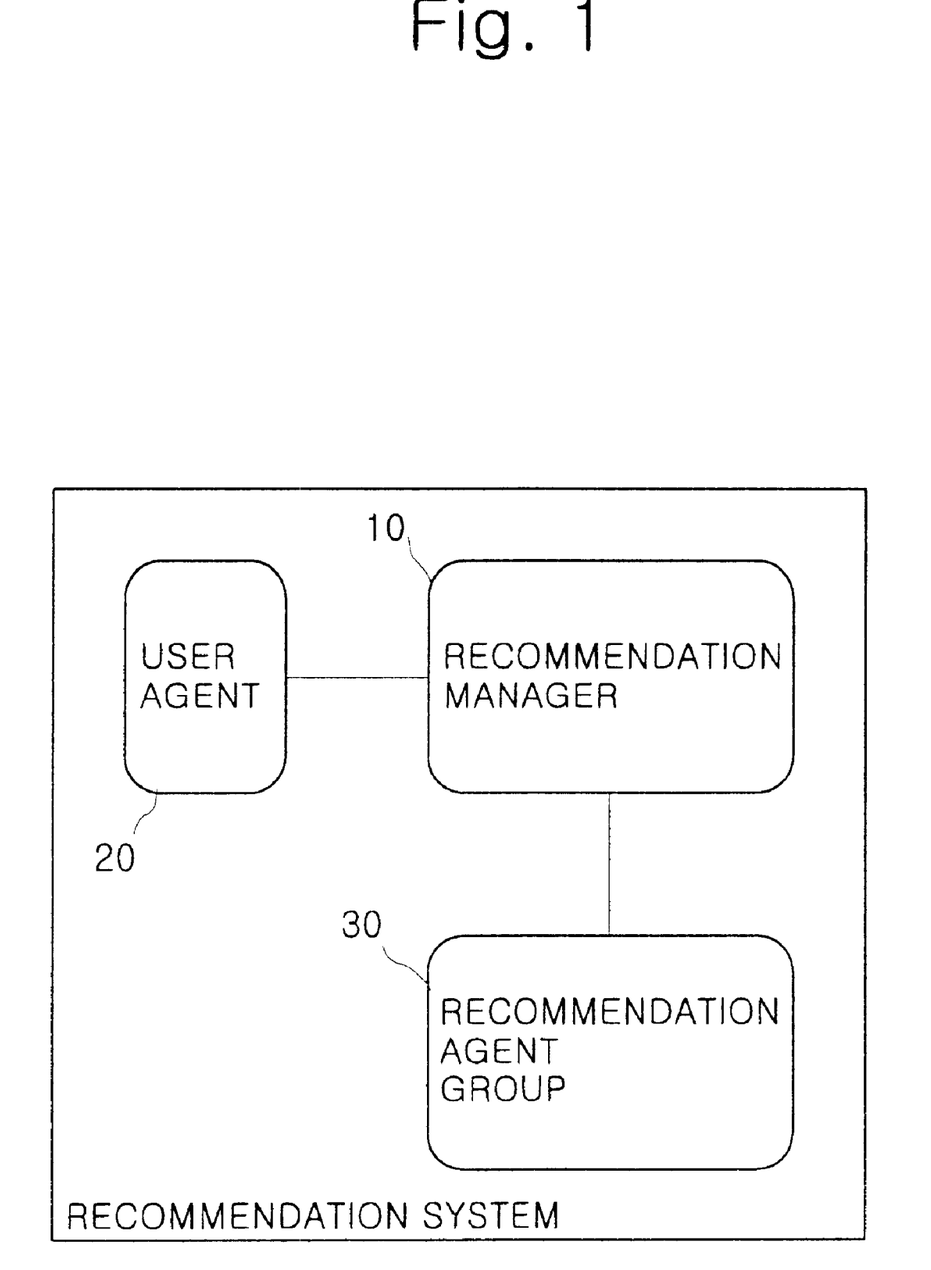
FIG. 1 is a diagram for explaining essential components constituting a recommendation system according to the present invention.

FIG. 1 is a diagram for explaining essential components constituting the recommendation system according to the present invention.

As shown in FIG. 1, the recommendation system of the present invention comprises three components of a recommendation manager 10, a user agent 20 and a recommendation agent group 30.

The user agent 20 holds basic and processed information on each user and values of influential power of recommendation agents on each user therein. The recommendation agent group 30 is composed of a plurality of agents carrying out recommendations to users. The recommendation manager 10 manages the user agent 20 and the recommendation agent group 30.

Primarily, the recommendation system of the present invention will be described in general.

Figure 2:
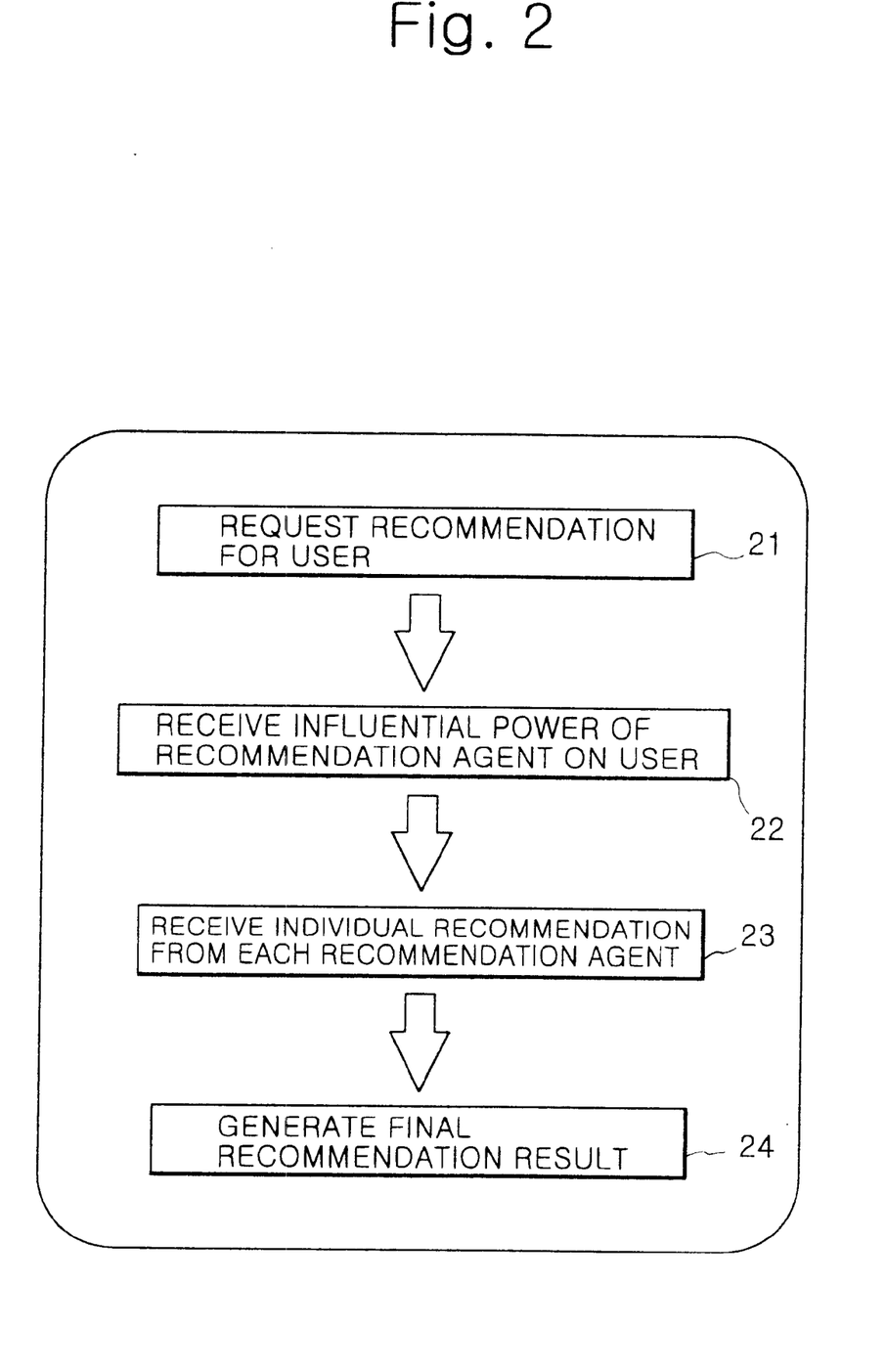
FIG. 2 is a flow chart of a recommendation operation performed by a recommendation system according to the present invention.

FIG. 2 is a flow chart of a recommendation operation carried out by the recommendation system according to the present invention.

If recommendation to a user is requested (21), the recommendation manager 10 determines how much influential power each recommendation agent has upon the user for whom the recommendation is required from the user agent corresponding to the user (22). Next, the recommendation manager 10 receives an individual recommendation from each recommendation agent (23). At this time, the recommendation manager 10 selects at least one recommendation agent under a predetermined internal logic and receives a list of items, which each selected recommendation agent recommends to the user for whom the agent generates an independent method, and auxiliary information from each selected recommendation agent. At last, a final recommendation result is generated (24). At this time, the recommendation manager 10 generalizes the values of influential power of the recommendation agents and the auxiliary information received at the step 23 to generate the final recommendation list presented to the user from the lists of the recommended items received at the step 23.

The following description concerns functions of the user agent, the recommendation agent and the recommendation manager constituting the recommendation system of the present invention.

The user agent will be first described.

Figure 3:
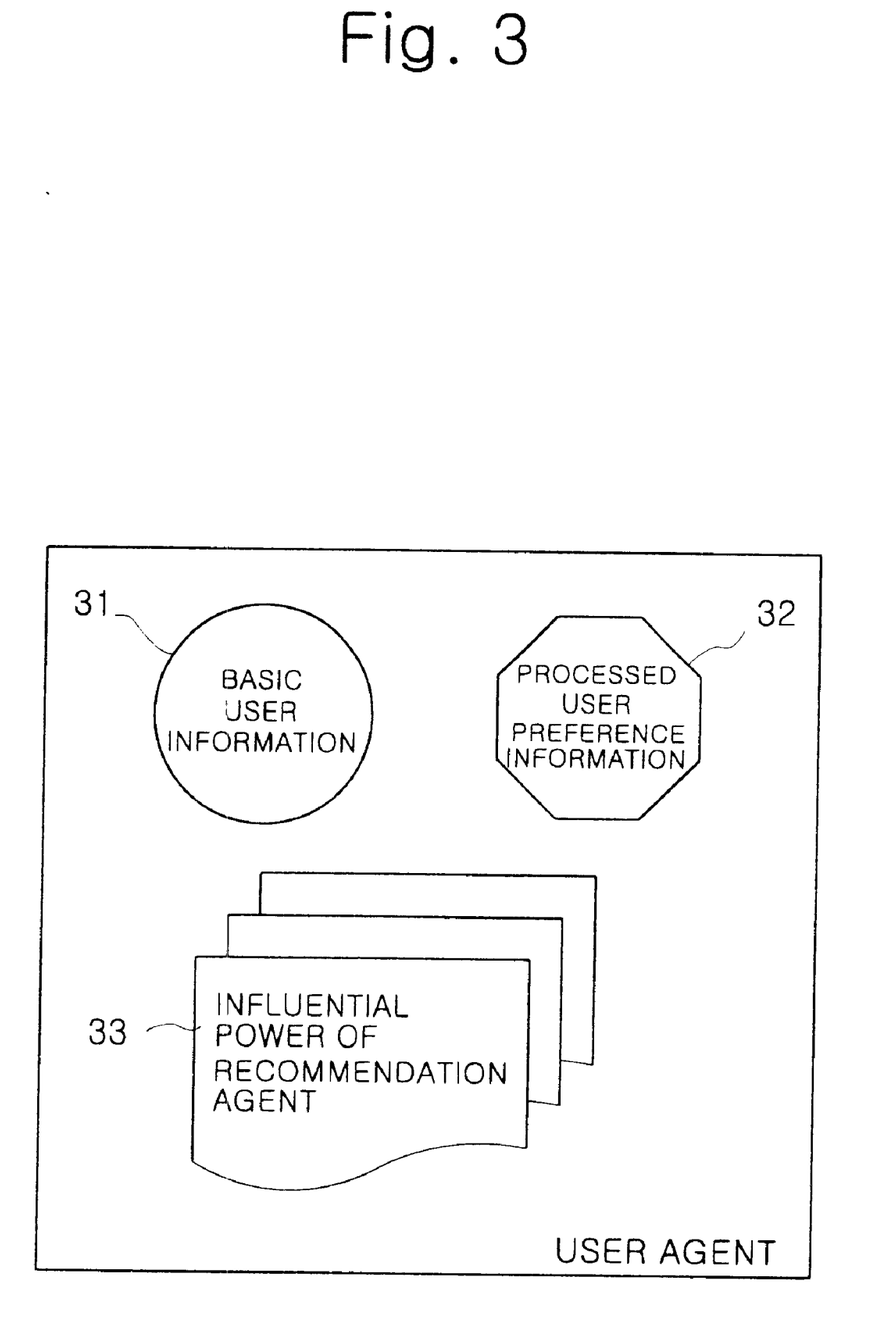
FIG. 3 is a diagram for explaining information managed by a user agent in a recommendation system according to the present invention.

FIG. 3 is a diagram for explaining information managed by the user agent in the recommendation system according to the present invention.

In the recommendation system of the present invention, every user is assigned his/her own part of the user agent. The user agent has user information and information of values of influential power of the recommendation agents. The user information may include 'basic user information 31' presenting general information on a corresponding user and 'processed user preference information 32'. The "influential power of the recommendation agent 33" is the information denoting how properly a corresponding recommendation agent has made recommendations to a corresponding user.

The influential power of each recommendation agent is a value representing to what extent the recommendation suggested to a corresponding user by a corresponding recommendation agent based upon experiences in the past is suitable for the corresponding user. The user agent includes the values of influential power of respective recommendation agents for each user. The influential power values are changeable depending upon expression of the degree of user's satisfaction with a corresponding recommendation. The recommendation manager carries out the change of the influential power of each recommendation agent. This change operation is called "adjustment of the influential power". This will be explained in detail later when describing the recommendation manager.

The recommendation agent will now be described. The recommendation agent generates a recommendation list to each user in response to a recommendation request of the recommendation manager, using an independent analyzing method. As long as the interface with the recommendation manager is kept, the recommendation agent does not have a restriction in its internal structure or logic and is operated independent of the recommendation manager.

Since each recommendation agent generates the list of recommended items in an independent manner, a variety of recommending methods have been conventionally suggested can be attempted by the recommendation agents.

The recommendation agent suggests recommendations based upon, for example, data of users' demographics, characteristics of items, the users' reaction information and other environmental information. The recommendation agent may be implemented through a single process, or alternately, have multiple step structure in favor of a rate and efficiency.

Figure 4:
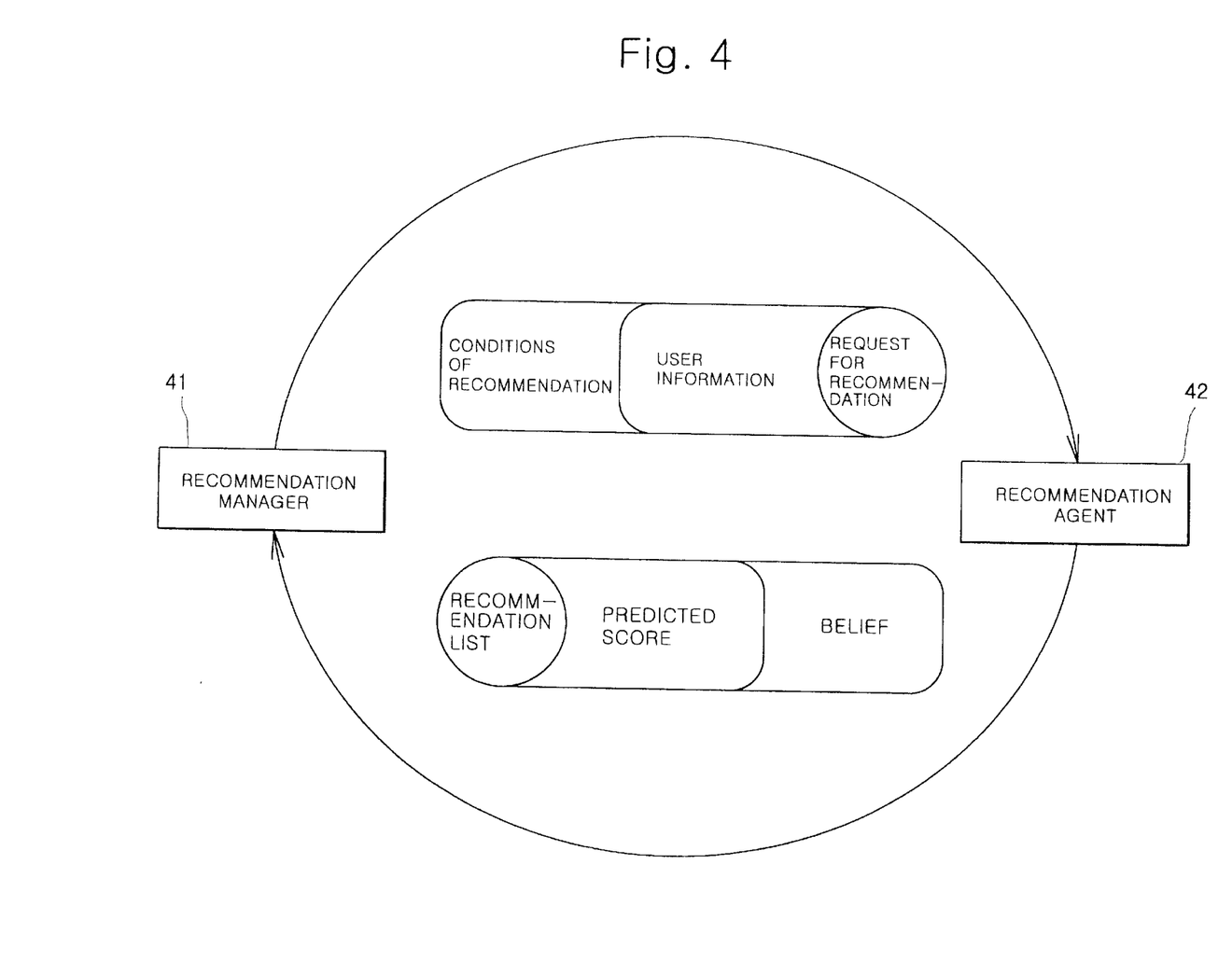
FIG. 4 is a diagram for explaining information communicated between a recommendation manager and a recommendation agent in a recommendation system according to the present invention.

FIG. 4 is a diagram for explaining information communicated between the recommendation manager and the recommendation agent in the recommendation system according to the present invention.

The recommendation manager 41 makes a recommendation request by sending the user information and conditions of recommendation to the recommendation agent 42. In response to the recommendation request from the recommendation manager 41, the recommendation agent 42 supplies a list of recommended items to a user and the auxiliary information of each item to the recommendation manager 41.

The auxiliary information of each item provided by the recommendation agent 42 includes a "predicted score" and a "belief". The "predicted score" is numerical value information predicted about the degree of user's preference for the item recommended by the corresponding recommendation agent 42. The "belief" is numerical value information representing the confidence of the corresponding recommendation agent 42 in the corresponding predicted score. When user's reaction to the item occurs, the auxiliary information of the item, that is, the predicted score and the belief provided by the recommendation agent 42 along with the item are used in adjusting the influential power upon a corresponding user (this will be more described below).

The user's preference reaction is expressed in the forms of, for example, direct estimation, establishment of a bookmark, visit, printing, purchase, search and so forth.

The predicted score, which is the numerical information of the prediction how much the user will like the item recommended by the recommendation agent, should be meaningful and standardized throughout the whole system. In other words, for all the recommendation agents in the recommendation system of the present invention, the predicted scores and the user's preference reactions which adjustment will be done based upon after the recommendations should be set at the values that can be compared based upon the same standard. For example, the predicted score may be represented by integers in a system rating on a maximum scale of 100 points.

Meanwhile, for the belief, it is preferable to use a numerical system that all the recommendation agents share with one another. Alternately, each recommendation agent may independently calculate the values of the belief, which permit the comparison between the beliefs of only a corresponding recommendation agent. As stated above, the belief represents the confidence of the recommendation agent in the predicted score of the recommended item to the user. The belief can be used for determining the amount of award/penalty for a difference between the predicted score and the user's actual reaction. Specifically, if the predicted score of the item whose belief is highly marked differs from the user's actual reaction to the item, the value of the influential power is adjusted to a lower value to impose the penalty.

The recommendation manager activates the plurality of the registered recommendation agents and receives individual recommendations to the corresponding user from the recommendation agents to finally generate a personalized recommendation result for the user. The recommendation manager communicates with respective recommendation agents through a single interface, so it is independent of the analyzing method of each recommendation agent. Therefore, as long as interface rules are kept, a variety of recommendation agents can be accommodated.

Major functions of the recommendation manager are the adjustment of the influential power of each recommendation agent for a particular user, the generalization of individual recommendation results based upon the influential power, the interfacing between the corresponding user agent and the recommendation agents and the management of shared resources.

Figure 5:
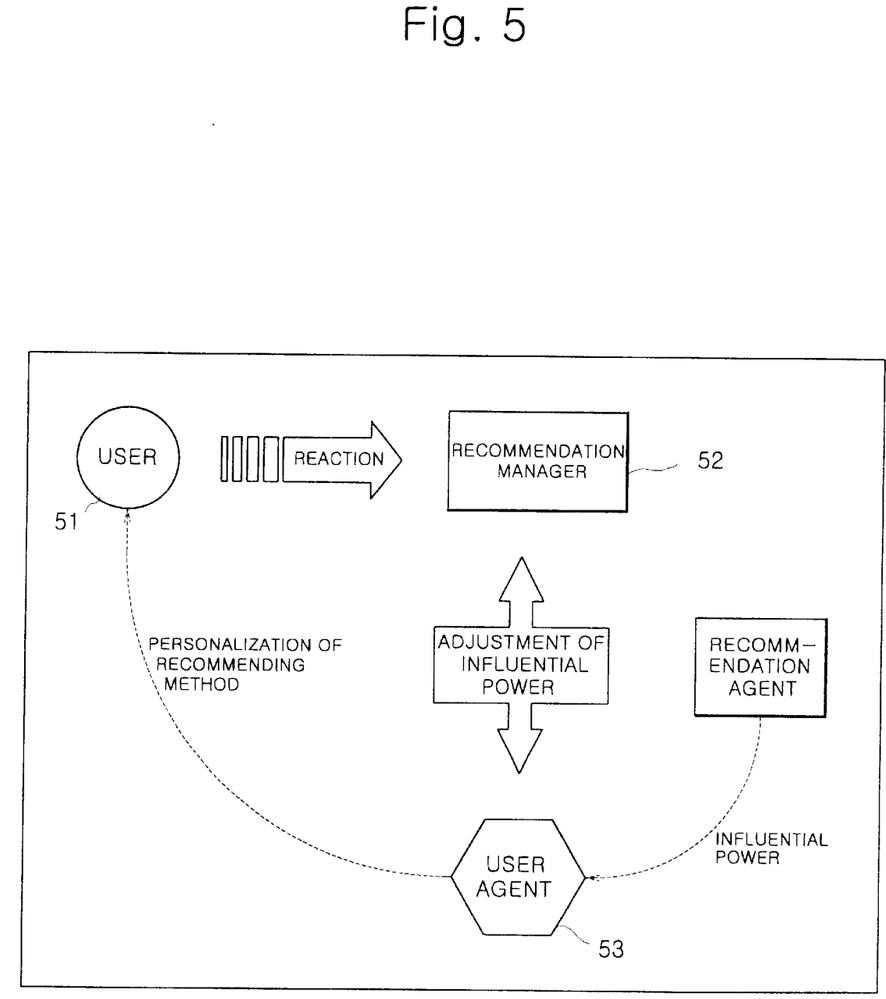
FIG. 5 is a diagram for explaining an influential power adjusting operation performed by a recommendation manager in a recommendation system according to the present invention.

FIG. 5 is a diagram for explaining the influential power adjusting operation by the recommendation manager in the recommendation system according to the present invention.

If a user 51 reacts to a recommended item, a recommendation manager 52 commences the adjustment of the influential power of each recommendation agent held by a user agent 53 in response to the reaction. In other words, each recommendation agent is awarded or punished based upon the user's reaction to the item recommended by the corresponding recommendation agent, its predicted score for the user, and its corresponding belief. The awarded or punished result is reflected on the value of the influential power of the corresponding recommendation agent stored in the user agent 53 and considered during a subsequent operation related to another recommendation.

The influential power of each recommendation agent, which is dynamic information changing depending upon the user's reaction to a corresponding recommendation, is an important ground on which even the recommendation method can be personalized.

The adjustment of the influential power is performed based upon a mathematical formula. For example, an influential power value ($Influence^k_i(n)$) of a recommendation agent, k, with respect to the n-th recommendation to a user, i, is determined by a formula having variables of the preceding influential power value of the recommendation agent, k, for the user, i, namely, the (n−1)-th influential power value ($Influence^k_i(n-1)$), a predicted score ($score^k_{ij}{}'$) of the recommendation agent, k, with respect to an item, j, for the user, i, an actual score ($score^k_{ij}$) of the user, i, with respect to the item, j, and a belief ($belief^k_{ij}$) of the recommendation agent, k, with respect to the item, j, for the user, i.

In case that recommendation is required for a particular user, the recommendation manager receives the user information (basic information and processed user preference information) and the influential power value of each recommendation agent from the user agent corresponding to the particular user. The recommendation manager selects at least one recommendation agent according to the predetermined internal logic based upon the above information and receives from each selected recommendation agent, a list of items recommended by each selected agent to the user for whom the corresponding agent creates an independent method.

A relatively simple internal logic may be embodied such that the number of lists recommended by recommendation agents is adjusted based upon a relative ratio of the influential power or a certain recommendation agent is designed to assume full charge after a predetermined number of times. There may be more systematic methods such as a regression analysis using the predicted score and the belief as independent variables and a systematic method employing a neuron network.

The foregoing procedure is essential when the recommendation manager carries out the recommending operation personalized for each user using the item recommended to a user by each recommendation agent, the corresponding predicted score and belief and the influential power of each recommendation agent stored in the user agent.

Finally, the recommendation manager generalizes the influential power values of respective recommendation agents and the auxiliary information received from the recommendation agents along with recommendation lists to generate a final recommendation list for the user from lists of recommended items received from the recommendation agents.

In addition, when necessary, the recommendation manager serves as a relay for receiving common information requested by each recommendation agent and sending it to each recommendation agent and manages the shared resources such as a data access path, data cache, computational logic and so on.

Figure 6:
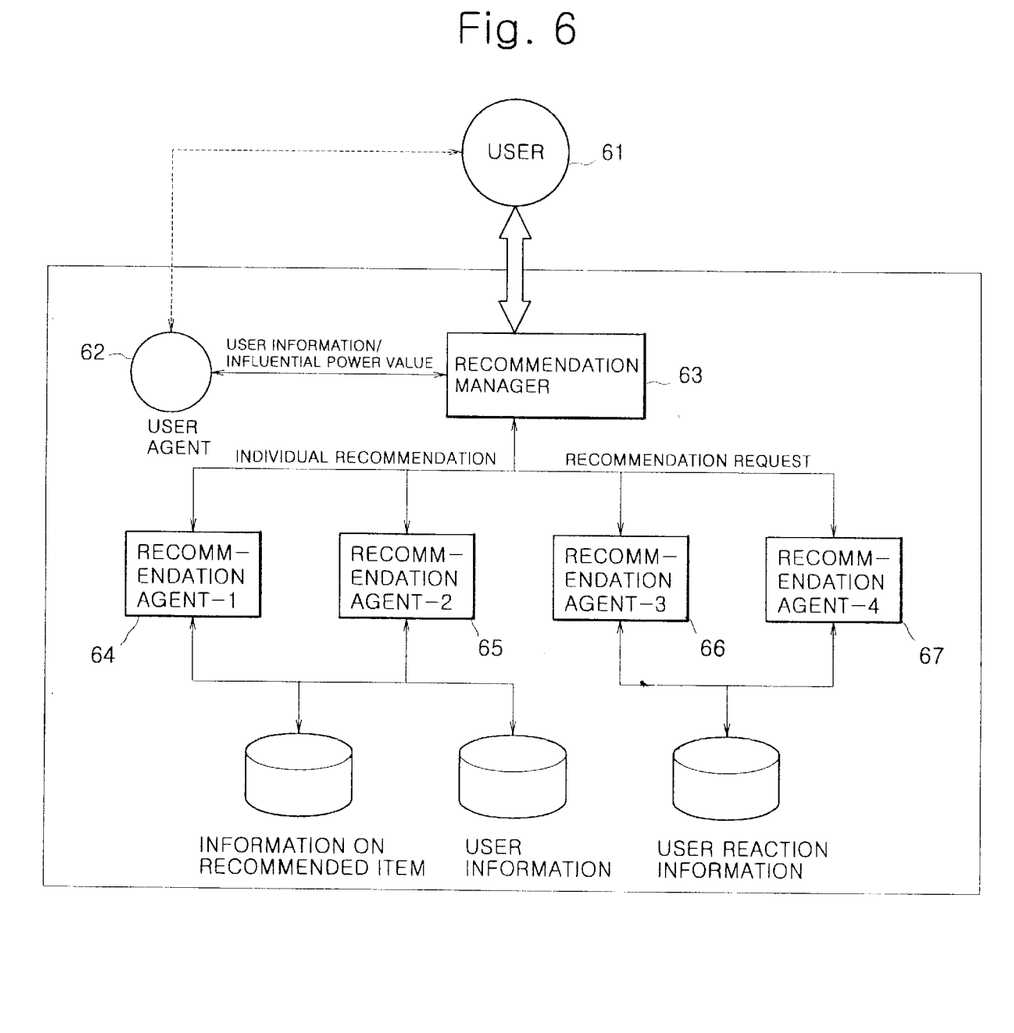
FIG. 6 is a diagram showing an overall structure of a recommendation system according to the present invention.

FIG. 6 is a diagram showing an overall structure of the recommendation system according to the present invention.

According to the recommendation system of the present invention, a user to whom the recommendation is made should belong to a user agent 62. The user agent 62 includes the user information on the corresponding user and influential power values of respective recommendation agents on the user.

When the recommendation is required for the particular user 61, the recommendation manager 63 receives the user information and influential power values of respective recommendation agents from the user agent 62 where the user 61 belongs. Subsequently, the recommendation manager 63 selects one or more recommendation agents based upon the predetermined internal logic. In this occasion, all the recommendation agents may be selected in accordance with the internal logic. The recommendation manager 63 sends the user information and the conditions of recommendation to the selected recommendation agents 64~67 to request the recommendation. Each of the recommendation agents 64~67 provides a list of recommended items to the recommendation manager 63 in an independent method. At this time, each recommendation agent also provides the predicted score on each recommended item and a corresponding belief as the auxiliary information. The recommendation manager 63 determines a final list of the recommended items for the user 61 in consideration of the lists of recommended items and auxiliary information received from respective recommendation agents 64~67 and the user information and the influential power values of the recommendation agents 64~67 received from the user agent 62. After the recommendation, the recommendation manager 63 adjusts the influential power value of each recommendation agent upon the user 61, which is stored in the user agent 62, according to the user's reaction to the recommended items.

In brief, the recommendation system of the present invention largely carries out two kinds of operations, that is, the operation of recommending items to the user and the operation of changing the internal information based upon the user's reaction.

The recommending operation for the user is established such that each recommendation agent creates the list of recommended items using its independent analysis method, and the recommendation manager selects at least one recommendation agent according to the internal logic based upon the information stored in the user agent and determines the final recommendation list to be provided for the user.

The operation of changing the internal information in response to the user's reaction is established such that, in case that the user reacts to the recommended items allowing the extent of preference for the recommended items to be recognized, the influential power value of each recommendation agent on the user is adjusted in response to the reaction and then the adjusted influential power value is stored in the user agent for a subsequent recommending operation.

Particularly, the recommendation system of the present invention allows the personalized recommendation to each user by using information such as the influential power value of each recommendation agent on each user. In addition, each recommendation agent generates a recommendation list in its independent manner to the recommendation manager, so various, conventional recommending methods can be attempted by the respective recommendation agents. In this step, a variety of methods employing the analysis of demographic data, the general probability and statistic theory, the collaborative filtering, the content-based filtering, a rule-based recommending method, the neuron network theory and so on can be attempted.

Moreover, since the recommendation manager determines the final list of recommended items from the lists generated by the recommendation agents in consideration of the auxiliary information, the user information, and the influential power value of each recommendation agent, the various, conventional recommending methods attempted by the respective recommendation agents can be integrated by the recommendation manager. Additionally, the recommendation manager adjusts the influential power value of each recommendation agent in response to the user's reaction after the recommendation and allows the adjusted influential power value to be reflected on the following recommendation, thereby improving the quality of the recommendation.

It will be apparent to those skilled in the art that various modifications and variations can be made in the system for recommending items with multiple analyzing components of the present invention without deviating from the spirit or scope of the invention. Thus, it is intended that the present invention covers the modifications and variations of this invention provided they come within the scope of the appended claims and their equivalents.

What is claimed is:

1. A system for recommending items, said system comprising:
   (a) computer code for establishing a plurality of recommendation agents, each of said recommendation agents providing:
      (i) a list of recommended items for each of a plurality of users,
      (ii) a predicted score of rating that is numerical value information predicted about an extent of each user's preference for the item recommended by each corresponding recommendation agent, and
      (iii) a belief that is numerical value information representing confidence of said each corresponding recommendation agent in its predicted score;
   (b) computer code for establishing a user agent wherein said code causes the user agent to store a profile for holding basic formation on each user and influential power information of each recommendation agent with respect to each user: and
   (c) computer code for establishing a recommendation manager for:
      (i) selecting one or more recommendation agents from said plurality of recommendation agents using the basic user information and the influential power information of each recommendation agent with respect to each user received from said user agent,
      (ii) generating a final list of recommended items from the list of recommended items suggested by the selected recommendation agent or agents using the basic information and the influential power of each recommendation agent received from said user agent, and
      (iii) adjusting the influential power of each recommendation agent according to the predicted score and the belief provided by each recommendation agent, and the extent of a user's actual preference for the recommendation.

* * * * *